March 5, 1946.        C. MUELLER        2,395,900
PROCESS FOR DEGREASING OF ANIMAL BONES
Filed Jan. 30, 1942
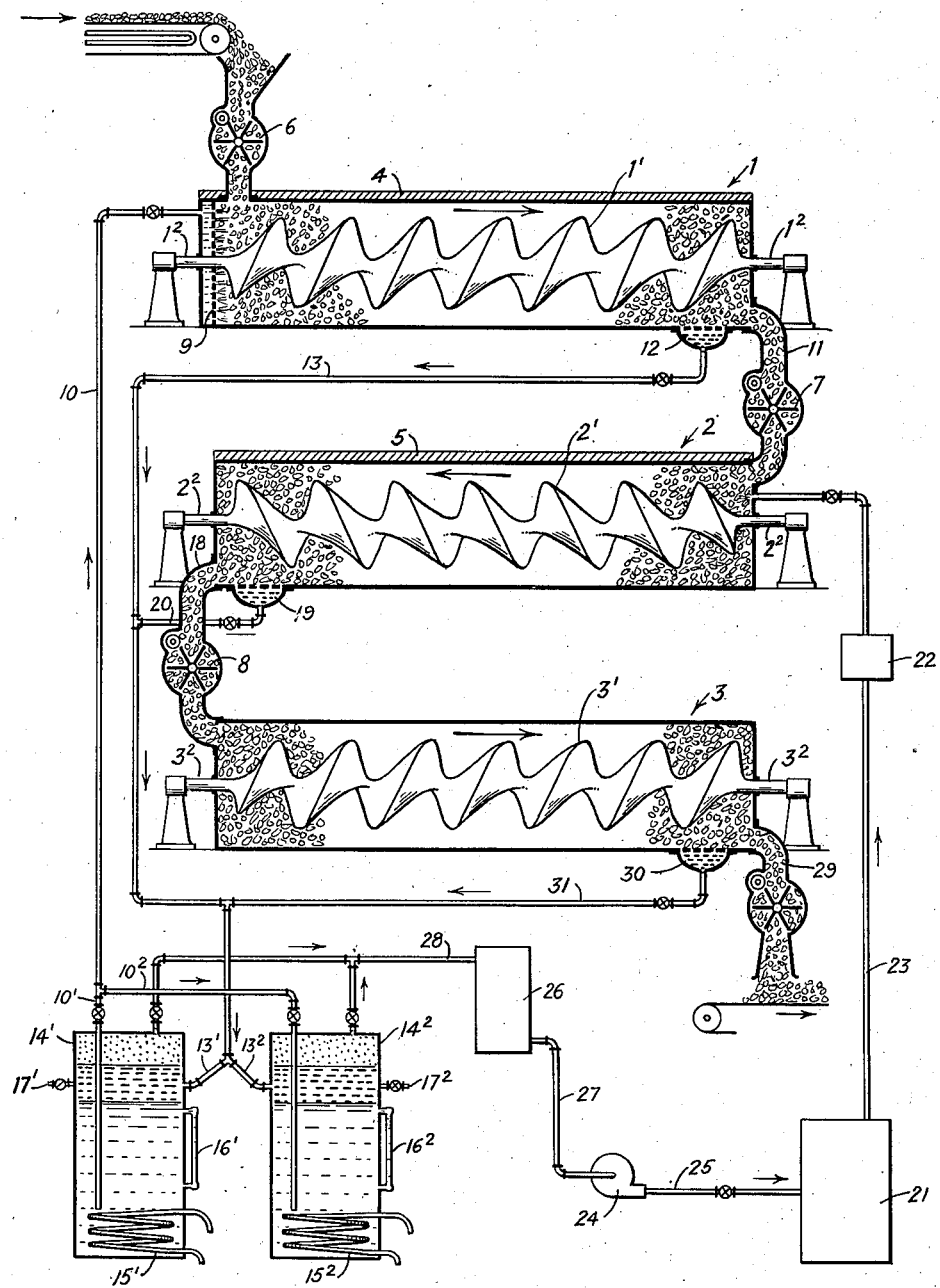
INVENTOR.
Camillo Mueller Patented Mar. 5, 1946

2,395,900

UNITED STATES PATENT OFFICE 2,395,900

PROCESS FOR DEGREASING OF ANIMAL BONES

Camillo Mueller, New York, N. Y.

Application January 30, 1942, Serial No. 428,877

11 Claims. (Cl. 260—412.6)

This invention relates to an improved process for making glue and gelatine from animal substances, such as bones, skin, cartilage, and particularly to a process in which the grease is practically completely removed from said substances especially from animal bones.

It is the primary object of the present invention to provide a process for making animal glue and gelatine from animal substances especially bones in which the bones are cleaned from grease without destroying the collagen and therefore resulting in a higher output of glue or gelatine and in which the removed grease is gained in such a way that it can be used for different purposes and even for cooking purposes when the bone material is fresh slaughter house material.

It is a further object of the present invention to make the process in a continuous way without interruption and to subject the bone material to the whole extraction and drying process for maximum four hours.

A still another object of the present invention is to achieve qualities of the glue or gelatine which are quite better than achieved by any known methods.

Another object of the present invention is to reduce the costs of the process, though better results are achieved.

All these objects are achieved by arranging the process of removing of grease from and conserving and drying of the bones by means of a manometric strain and a temperature from about 90° F. to about 175° F. The lowest temperature corresponds to the melting point of the grease of the chosen bone material whereas the highest temperature corresponds approximately to the coagulation point of albumin of the chosen bone material.

The said manometric strain inside of the bones can be achieved in different ways either by arranging different pressure inside and outside of the bones or by arranging different evaporating temperatures inside and outside of the bones. By this process all the grease is sucked off the pores mechanically. It is a special feature of the present invention that the whole process is arranged continuously by introducing into the apparatus the bones on one side, the latter being treated while travelling through the apparatus, and by releasing the dried bones and the grease respectively in different outlets.

There are several ways to follow the principle of the present invention, namely to remove the heated, liquid grease from the bones by using a pressure on the material.

One way to achieve the necessary pressure is to raise the temperature of the bone material to about 90° F. until 175° F. in a closed container and then to subject the container in which the bone material is treated suddenly to high vacuum. Under this procedure the water or fluid inside of the bone will vaporize. The sudden vaporization of the water inside of the bone will provide a high pressure which pushes all the grease out of the pores without destroying the albumin nor damaging the grease.

Another way to achieve the pressure is to be seen in continuous moistening of the bone material with a solution of acids or salts which raise the boiling point of the water or fluid in correspondence with the degree of saturation under vacuum, whereby the vacuum is adjusted to such a degree that the boiling point of the fluid does not rise above the temperature of 175° F. or above the coagulation point of the chosen material. Since the said solution of acids or salts cannot intrude into the bone but stays on its outside, the water inside of the bone will have the normal boiling point, whereas the water on the outside, on account of the said solution, will have the raised boiling point. By heating the bone material, the water on the inside of the bone will vaporize and by raising the temperature high pressure will result in the inside of the bone, while the water or fluid on the outside of the bone still has not reached its raised boiling point. The high pressure in the inside of the bone will work in removing of the grease out of the pores of the bone.

A still another way to achieve the pressure is to be seen in the use of heated gases, such as air, gases of internal combustion engines, indifferent gases, as carbonic acid or nitrogen, gases of solvents for grease, such as benzene or alcohol, which gases are introduced into the apparatus in a steady stream, thereby heating the grease above the melting point. By this method again a different pressure will result inside and outside of the bone material because the water or fluid will vaporize on account of the heat introduced by the heated gases and the pressure will rise inside of the bone due to the grease in the pores of the bones which grease blocks said pores for the exit of the evaporated fluid. Due to this pressure the grease will be removed in a dynamic way from the bone material. By using different velocity of the said stream of gases the pressure within the bone material can be controlled. Furthermore it is possible to preserve the bone material and to avoid the derivation of the collagen by using indifferent gases according to the present invention.

A further way to achieve the pressure is to be seen in arranging a perforated wall or controlling valve or other pressure reducing means between the container, in which the bone material is treated under a temperature of about 90° F. unto about 175° F. and under vacuum to remove the liquid grease, and the pumping device. In this way the pressure is assured by reduction of the sectional area and the grease will be sucked off from the bone material.

In the accompanying drawing a sectional view of the apparatus is illustrated by example only, which serves to perform the process according to the present invention.

The apparatus consists of three containers 1, 2 and 3 each of which has arranged a feeding screw $1^1$, $2^1$, and $3^1$ turning upon axles $1^2$, $2^2$, $3^2$. Merely the upper half of the container 1 and 2 is covered by a heater, preferably a steam heater 4 and 5, respectively, to avoid a dangerous contact of the bone material with the heated wall, whereas the third container 3 is not heated at all. A feeding device 6, 7, and 8, respectively, is adapted on top of each container 1, 2, and 3, respectively, which feeding device works in such a way that the continuous feeding of the respective containers is achieved without connecting them directly with the atmosphere or with the previous container. The first container 1 is equipped with a perforated wall 9 just before the feeding device 6. A tube 10 ends into the end wall of said container 1, which tube 10 conveys a salt solution to the perforated wall 9 to be sprayed over the entering bone material in the container 1.

A tube 11 containing the feeding device 7 connects the first container 1 with the second container 2 conveying the treated bone material from the first to the second container. Besides that the first container 1 has arranged on its bottom an outlet 12 for grease and superfluous salt solution ending into a tube 13. The tube 13 parts into two branches $13^1$ and $13^2$ which guide into the upper part of two containers $14^1$ and $14^2$. The former mentioned tube 10 also ends into two branches $10^1$ and $10^2$ which end near the bottom of the said containers $14^1$ and $14^2$, respectively. The containers $14^1$ and $14^2$ receive the salt solution which returns to the container in a closed circuit from the tube 10 through the apparatus to the tube 13. Heating coils $15^1$ and $15^2$ are arranged in the container $14^1$ and $14^2$, respectively, in order to heat the salt solution. The removed grease also runs through the tube 13 into the container $14^1$ and $14^2$, respectively, and the grease will then swim on the top of the fluid. Show windows $16^1$ and $16^2$ are provided on the outside of the container $14^1$ and $14^2$ to show the level of the salt solution or the stand of the grease. In the upper half of the container $14^1$ and $14^2$, respectively, outlets $17^1$ and $17^2$ are provided to remove the grease.

Another tube 18, containing the feeding device 8 for the third container 3, connects the second container 2 with the third container 3. On the bottom of the container 2 an outlet 19 is provided which receives the grease removed in the second container 2 and which runs through a connecting tube 20 to the tube 13. A gas container 21 is connected with the second container 2 by a tube 23 which is guided through a heating device 22 in order to heat the indifferent gases. On the other hand the gas container is connected with a pumping device 24 by a tube 25 and said pumping device with a condensator 26 by a tube 27. The condensator 26 is connected with the top of the container $14^1$ and $14^2$, respectively, by the tube 28.

The third container 3 has an outlet 29 for the removal of the treated bones and at the bottom an outlet 30 for the grease removed from the bones, which outlet 30 is connected with the tube 13 by a tube 31.

So the gas circuit is closed through the containers $14^1$ and $14^2$, respectively.

The described apparatus allows a continuous treatment of the bone material, which, after being transported to the apparatus by a conveyor which may be equipped with a heating device, needs a certain time to travel through all containers 1, 2, and 3, which time is sufficient to remove all the grease from the bones. It has been found that nearly all the grease is removed in such a form that it can be used even for cooking purposes when the bone material is fresh slaughter house material. The whole system stays under vacuum on account of the pumping device 24 which is inserted in the circuit.

The bone material is inserted into the first container by the feeding device 6 and immediately a salt solution sprayed over the bone material. The feeding screw $1^1$ moves the material in the direction of the arrow to the other end of the container 1, comes through the feeding device 7 into the second container 2, where it is again moved by the feeding screw $2^2$ in the direction of the arrow to the other end of the container 2 and through the feeding device 8 into the container 3. The feeding screw $3^2$ moves the bone material again in the direction of the arrow to the other end of the container 3 to the outlet 29. Here the bone material is received undamaged and may be transported by another conveyor to another apparatus where it may be transformed into glue or gelatine material of the highest quality.

The grease is collected from all three containers 1, 2, and 3 in the container $14^1$ and $14^2$, respectively. There are provided two containers in order to continue the process when salt solution is filled into or grease is removed from one of the containers $14^1$ or $14^2$. Both containers $14^1$ and $14^2$ can be closed up from the tubes $10^1$ and $10^2$, $13^1$ and $13^2$, and 28 by arranging valves, preferably relief valves, in the respective tubes.

The new principle according to which the bone material is treated under heat and vacuum by producing a manometric strain between the inside of the bone material and the pumping device achieves never obtained results. First of all the whole process is done continuously at a predetermined temperature and the whole extraction is completed within a maximal time of four hours. The new process results the best bone material after being cleaned from all parts and gives quite the best qualities of glue or gelatine. The process is tremendously cheaper because the whole work is done automatically without needing any labor for feeding or removing the materials, but by providing adequately conveyors for the transport of the bone material to and from the apparatus, whereby the conveyor for the transport of the material to the apparatus may be equipped with a heating device to heat the material before it enters the apparatus.

The following examples are given:

*Example 1*

100 parts by weight of homogeneous, broken, raw bone material in size of ½ to ¾ inches is heated to about 100° F. and introduced into a closed container of the extraction apparatus, in which container the bone material is sprinkled with 100 parts by weight of a 15% solution of calcium chlorid (boiling point 105.7° F.) at a vacuum of 28 in., which is heated up to a temperature of about 100° F. in a vacuum of about 28 inches. The boiling point of the bone water is 100° F. at a vacuum of 28 in. The superfluous salt solution is sucked off with the grease to the grease container.

Example 2

100 parts by weight of homogeneous, broken, raw bone material in size of ½ to ¾ inch is heated to about 100° F. and introduced into a closed container of the extraction apparatus. A stream of 500 parts of volume of carbonic acid gas heated to 340° F. is introduced into the container under vacuum of 23.5 inches and a temperature in the container of 141° F., whereas the vacuum on the pumping device is 28 inches and the temperature on the pumping device is 100° F.

Example 3

100 parts of weight of homogeneous, broken, raw bone material in size of ½ to ¾ inches is heated to about 104° F. or the melting point of the grease, respectively, and introduced into a closed container of the extraction apparatus and then suddenly exposed to a vacuum of 29.18 inches. Thus a sudden evaporation of the water inside of the bone material is achieved which results in pressure to the outside of the bone material.

What I claim is:

1. Process for degreasing of moist bone material consisting in subjecting the said animal bone material to a temperature of about 90° F. to about 175° F. in a closed container and further subjecting said animal bone material to a higher pressure inside than outside of said bone material, thereby removing grease from said bone material.

2. Process for degreasing of moist bone material consisting in subjecting said bone material to a temperature of about 90° F. to 175° F. in a closed container and subjecting said bone material to a vacuum of a degree corresponding to the chosen boiling temperature of water contained in said bone material, thereby removing grease from said bone material.

3. Process for degreasing of moist bone material consisting in subjecting said bone material to a temperature of about 90° F. to about 175° F. in a closed container and subjecting said bone material within a short period of time to a vacuum of a degree corresponding to the chosen boiling temperature of water contained in said bone material, thereby removing grease from said bone material.

4. Process for degreasing of moist bone material consisting in subjecting said bone material to a temperature of about 90° F. to about 175° F. in a closed container and to a vacuum of a degree corresponding to the chosen boiling temperature of water contained in said bone material, and in spraying on said bone material a fluid having a higher boiling point than that of the water contained in said bone material, thereby evaporating said water contained in said bone material before the evaporation of the said fluid within said container and removing grease from said bone material.

5. Process for degreasing of moist bone material consisting in subjecting the said bone material to a temperature of about 90° F. to about 175° F. in a closed container and to a vacuum of a degree corresponding to the chosen boiling temperature of water contained in said bone material, and further subjecting said bone material to a stream of gases of a temperature higher than the boiling temperature of said water contained in said bone material, thereby removing grease from said bone material by evaporation of said water in said bone material.

6. Process for degreasing of moist bone material consisting in subjecting the said bone material to a temperature of about 90° F. to about 175° F. in a closed container and to a vacuum of a degree corresponding to the chosen boiling temperature of water contained in said bone material, and further subjecting said bone material to a stream of indifferent gases of a temperature higher than the boiling temperature of said water contained in said bone material, thereby removing grease from said bone material by evaporation of said water in said bone material.

7. Process for degreasing of moist bone material consisting in subjecting the said bone material to a temperature of about 90° F. to about 175° F. in a closed container and to a vacuum of a degree corresponding to the chosen boiling temperature of water contained in said bone material, and further subjecting said bone material to a stream of gases of solvents of grease of a temperature higher than the boiling temperature of said water in said bone material, thereby removing grease from said bone material by evaporation of said water in said bone material.

8. Process for degreasing of moist bone material consisting in subjecting the said bone material to a temperature of about 90° F. to about 175° F. in a closed container and subjecting said bone material within said container to a suddenly reduced pressure by pressure reducing means, into a vacuum of a degree corresponding to the chosen boiling temperature of water contained in said bone material, thereby removing grease from said bone material by evaporation of said water in said bone material.

9. Process for degreasing of moist bone material consisting in subjecting the said bone material to a temperature of about 90° F. to about 175° F. in a closed container and subjecting said bone material to a reduced pressure into a vacuum of a degree corresponding to the chosen boiling temperature of water contained in said bone material by reducing suddenly the pressure in said closed container, thereby removing grease from said bone material by evaporation of said water in said bone material.

10. Process for degreasing of moist bone material, consisting in entering said bone material continuously by entrance means into a closed container, removing continuously said bone material by exit means from said closed container, subjecting said bone material during their travel through said container to a temperature of about 90° F. to about 175° F., and further subjecting said bone material within said container to a lower pressure than that inside of said bone material, thereby removing grease from said bone material.

11. Process for degreasing of moist bone material, consisting in entering said bone material continuously by entrance means into a closed container, moving steadily said bone material through said container, removing continuously said bone material by exit means from said closed container, subjecting said bone material during their travel through said container to a temperature of about 90° F. to about 175° F. and to a vacuum corresponding to the chosen boiling temperature of water contained in said bone material, thereby achieving within said container a lower pressure than that in said bone material and thus removing grease from said bone material.

CAMILLO MUELLER.